(12) United States Patent
Grufferty et al.

(10) Patent No.: US 11,420,720 B2
(45) Date of Patent: Aug. 23, 2022

(54) AIRCRAFT DOOR CONTROL

(71) Applicant: Airbus Operations Limited, Bristol (GB)

(72) Inventors: Mark Grufferty, Bristol (GB); Nicholas Elliott, Bristol (GB); Martin Griffith Rowlands, Bristol (GB); Christopher James Perkins, Bristol (GB)

(73) Assignee: Airbus Operations Limited, Bristol (GB)

( * ) Notice: Subject to any disclaimer, the term of this patent is extended or adjusted under 35 U.S.C. 154(b) by 574 days.

(21) Appl. No.: 15/980,004

(22) Filed: May 15, 2018

(65) Prior Publication Data

US 2018/0327073 A1    Nov. 15, 2018

(30) Foreign Application Priority Data

May 15, 2017   (GB) .................................... 1707777

(51) Int. Cl.
| | |
|---|---|
| *B64C 1/14* | (2006.01) |
| *G07C 5/00* | (2006.01) |
| *B64C 25/16* | (2006.01) |
| *B64F 5/60* | (2017.01) |
| *B64C 25/26* | (2006.01) |
| *B64C 25/00* | (2006.01) |

(52) U.S. Cl.
CPC .......... *B64C 1/1415* (2013.01); *B64C 25/001* (2013.01); *B64C 25/16* (2013.01); *B64C 25/26* (2013.01); *B64F 5/60* (2017.01); *G07C 5/006* (2013.01)

(58) Field of Classification Search
CPC ..... B64C 1/1415; B64C 1/1407; B64C 25/26; B64C 25/16; B64C 25/001; B64C 25/18; B64F 5/60; G07C 5/006; B64D 1/06
See application file for complete search history.

(56) References Cited

U.S. PATENT DOCUMENTS

| | | | |
|---|---|---|---|
| 4,573,649 A | 3/1986 | Yourkowski et al. | |
| 2004/0049319 A1* | 3/2004 | Kanki ................ | G05B 23/0272 700/275 |
| 2008/0251637 A1 | 10/2008 | Reynes | |
| 2009/0006846 A1* | 1/2009 | Rosenblatt ............ | H04W 12/08 713/159 |

(Continued)

FOREIGN PATENT DOCUMENTS

| | | |
|---|---|---|
| EP | 2572981 | 3/2013 |
| FR | 2875475 | 3/2006 |

(Continued)

OTHER PUBLICATIONS

European Search Reported cited in EP 18172285.1 dated Sep. 14, 2018, nine pages.

*Primary Examiner* — Peter D Nolan
*Assistant Examiner* — Michael F Whalen
(74) *Attorney, Agent, or Firm* — Nixon & Vanderhye P.C.

(57) ABSTRACT

An aircraft door controller 100 including a receiver 110 configured to receive a command 14 to move an aircraft door between an open position and a closed position relative to a door frame. The aircraft door controller 100 is configured to not store the command 14 when power to move the aircraft door between the open position and the closed position relative to the door frame is unavailable.

15 Claims, 3 Drawing Sheets

(56) References Cited

U.S. PATENT DOCUMENTS

| | | | |
|---|---|---|---|
| 2012/0236951 A1* | 9/2012 | Kosugi | H04L 1/0061 375/259 |
| 2013/0075527 A1* | 3/2013 | Lecourtier | B64C 25/16 244/129.5 |
| 2013/0264418 A1 | 10/2013 | Frank | |
| 2014/0252927 A1* | 9/2014 | Denny | G16H 20/17 312/209 |

FOREIGN PATENT DOCUMENTS

| | | |
|---|---|---|
| JP | 2007-120239 | 5/2007 |
| WO | 98/17528 | 4/1998 |

* cited by examiner

AIRCRAFT DOOR CONTROL

RELATED APPLICATION

This application claims priority United Kingdom Patent Application GB 1707777.7 filed May 15, 2017, the entirety of which is incorporated by reference.

TECHNICAL FIELD

The present invention relates to movement of an aircraft door relative to a door frame, such as for access during maintenance procedures. In particular, the invention relates to an aircraft door controller, to an aircraft door control system comprising the aircraft door controller, to a method of controlling an aircraft door, and to an aircraft.

BACKGROUND

Opening and closing of an aircraft door, such as a landing gear bay door or a cargo bay door, may be required during a maintenance procedure. At times, power to open or close a door may be unavailable, such as when the door has been isolated from an aircraft power system. It is preferable that the system for controlling the door is unable to cause unexpected movement of the door once power is restored, to help preserve the safety of engineers or technicians working in the vicinity of the door.

SUMMARY

A first aspect of the present invention provides an aircraft door controller comprising a receiver configured to receive a command to move an aircraft door between an open position and a closed position relative to a door frame, wherein the aircraft door controller is configured to not store the command when power to move the aircraft door between the open position and the closed position relative to the door frame is unavailable.

Optionally, the command comprises an electrical signal.

Optionally, the controller is configured to not store the command by the controller not latching the command in memory.

A second aspect of the present invention provides an aircraft door control system, comprising a controller according to the first aspect of the invention, and a user input configured to cause generation of the command when operated by a user.

Optionally, the user control is operable by the user when the power to move the aircraft door between the open position and the closed position relative to the door frame is unavailable.

Optionally, wherein the user control is configured to cause generation of the command by movement of the user control to a first position, and wherein the user control is biased away from the first position.

Optionally, the aircraft door control system comprises a detector configured to detect a position of the aircraft door relative to the door frame, and the aircraft door controller is configured to cause movement of the aircraft door between the open position and the closed position relative to the door frame on the basis of an output of the detector.

Optionally, the user control is a first user control and the control system comprises a second user control, and the aircraft door control system is configured such that operation of the first user control causes generation of the command in dependence on a status of the second user control.

Optionally, the aircraft door control system is an aircraft landing gear bay door control system.

A third aspect of the present invention provides a method of controlling an aircraft door, the method comprising receiving a command to move the aircraft door between an open position and a closed position relative to a door frame and not storing the command, when power to move the aircraft door between the open position and the closed position relative to the door frame is unavailable.

Optionally, the command is generated by actuation of a user control, and the user control is free to be actuated when the power to move the aircraft door between the open position and the closed position relative to the door frame is unavailable.

Optionally, the command is generated by movement of the user control to a first position against a biasing force.

Optionally, the command comprises an electrical signal.

Optionally, the not storing the command comprises not latching the electrical signal in memory.

Optionally, the command comprises a command to move the aircraft door from the open position to the closed position relative to the door frame.

Optionally, the power comprises hydraulic power and/or electrical power.

Optionally, the aircraft door is a landing gear bay door or a cargo bay door.

A fourth aspect of the present invention provides a non-transitory computer-readable storage medium storing instructions that, if executed by a processor of an aircraft door controller, cause the processor to carry out the method according to the third aspect of the present invention.

A fifth aspect of the present invention provides an aircraft comprising one or more of: an aircraft door controller according to the first aspect of the present invention, an aircraft door control system according to the second aspect of the present invention, and a non-transitory computer-readable storage medium according to the third aspect of the present invention.

A sixth aspect of the present invention provides an aircraft door controller for controlling movement of an aircraft door, wherein the aircraft door controller is configured to not store information representative of an instruction to move the aircraft door relative to a door frame, in dependence on the availability, at the time when the instruction is received by the controller, of power to perform the instructed movement of the aircraft door.

Optionally, the instruction comprises an electrical signal.

Optionally, the controller is configured to not store the information by not latching the instruction in memory.

It is to be noted that, herein, the phrase "between the open position and the closed position" covers movement from the open position to the closed position, and movement from the closed position to the open position. In some embodiments, the movement is from the open position to the closed position, and in other embodiments the movement is from the closed position to the open position.

It is also to be noted that, herein, reference to storing or not storing a command or instruction may comprise storing or not storing, respectively, information representative of the command or instruction.

BRIEF DESCRIPTION OF THE DRAWINGS

Embodiments of the invention will now be described, by way of example only, with reference to the accompanying drawings, in which.

DETAILED DESCRIPTION

The following description relates to controllers, control systems and methods for controlling movement of an aircraft door between an open position and a closed position relative to a door frame.

In known systems, a command to move an aircraft door between an open position and a closed position relative to a door frame is generated by user-operation of an actuator, such as a lever. When power to move the aircraft door is unavailable, an interlock prevents a user from actuating the actuator, so that the command cannot be generated. When power to move the aircraft door is restored, the interlock is released so that the actuator is then free to be actuated to cause generation of the command. Such systems can be relatively large and heavy, with a relatively high number of moving parts. However, there is a general inertia in the aircraft industry to continue using such systems, as they are perceived to have a degree of reliability that outweighs their disadvantageous size and weight.

Figure 1:
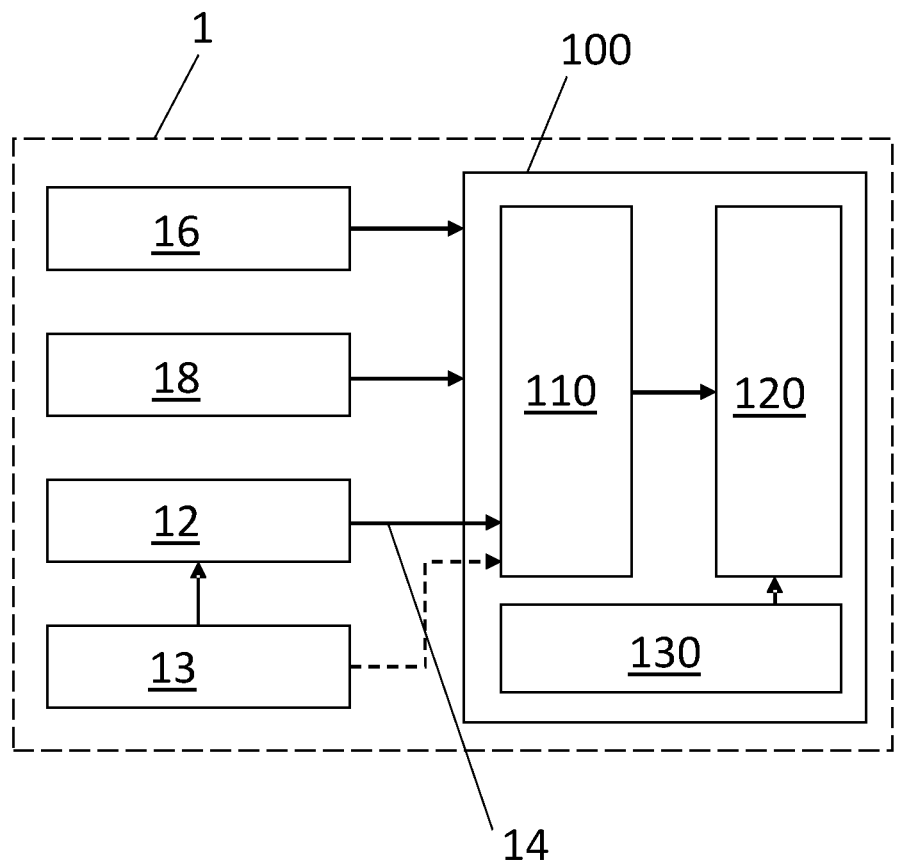
FIG. 1 shows a schematic view of an example of an aircraft landing gear door control system according to an embodiment of the invention.

FIG. 1 shows a schematic diagram of an example of an aircraft landing gear door control system 1 according to an embodiment of the invention. The aircraft landing gear door control system 1 comprises an aircraft door controller 100 according to an embodiment of the invention, and a user control 12 configured, when operated by a user, to cause generation of an instruction or command 14 to move an aircraft landing bay door between an open position and a closed position relative to a door frame.

In some embodiments, the aircraft landing gear door control system 1 is independent to a Normal Landing Gear Bay Door Operating System. That is, the aircraft landing gear door control system 1 may be for use only when the aircraft is on the ground, and not for opening and closing the landing gear bay door during landing and take-off.

It will be understood that in other embodiments the invention may be employed additionally or alternatively to control movement of one or more cargo bay doors, in which case the system comprises an aircraft cargo bay door control system.

In some embodiments, the aircraft door controller 100 is for controlling movement of an aircraft door. The controller 100 may be configured to not store information representative of an instruction to move the aircraft door relative to a door frame, in dependence on the availability, at the time when the instruction is received by the controller, of power to perform the instructed movement of the aircraft door.

In some embodiments, particularly those in which the aircraft door is moveable using an electro-hydraulic actuator, the aircraft door control system is configured to allow the aircraft door to be moved towards the open position under the influence of gravity. That is, the door may be locked when in the closed position, and the lock is released to allow the aircraft door to move towards the open position when the command 14 is received and the power is available. Movement of the aircraft door under gravity may be controlled by a damping mechanism. In other embodiments, movement of the aircraft door in each direction between the open position and the closed position may be controlled and effected throughout the full movement of the door by actuation of an actuator. The actuator may be, for example, a hydraulic, electro-hydraulic, pneumatic or electro-mechanical actuator.

Broadly speaking, the controller 100 comprises a receiver 110 configured to receive the instruction or command 14 to move the aircraft door between the open position and the closed position relative to the door frame. The receiver 110 may be configured to receive the command 14 wirelessly. Alternatively, the receiver 110 may be configured to receive the command 14 via electrical wiring, or another suitable interface. The controller 100 is configured to not store the command 14 when power to move the aircraft door between the open position and the closed position relative to the door frame is unavailable. That is, the controller 100 is configured to not store the command 14 in dependence on the availability, at the time when the instruction 14 is received by the controller 100, of power to perform the instructed movement of the aircraft door. Not storing the instruction or command 14 may comprise not storing information representative of the instruction or command 14. In some examples, when the power is unavailable, the controller 100 is configured to ignore the instruction or command 14.

In this embodiment, the controller 100 is configured to cause movement of the aircraft door between the open position and the closed position relative to the door frame only when the instruction or command 14 is received by the receiver 110 and the power to move the aircraft door between the open position and the closed position relative to the door frame is available.

The controller 100 of this embodiment comprises a processor 120. The processor 120 is configured to receive from the receiver 110 a signal indicative of whether the power is available. In an alternative embodiment, the signal indicative of whether the power is available may be received at the processor 120 from other than the receiver 110. In some embodiments, the processor 120 may be configured to determine whether the power is available, and to store the command 14 or information representative of the command 14 when the power is available. In this embodiment, the controller 100 comprises a memory 130, and the processor 120 is configured to store the command 14, or information representative of the command 14, in the memory 130 when the power is available. In other embodiments, the processor 120 may be configured to not store the command 14 or information representative of the command 14, even when the power is available.

In this embodiment, the command 14 comprises an electrical signal. Further, in this embodiment, the controller 100 is configured to not store the command 14 by the controller 100 not latching the command 14 in the memory 130.

In embodiments of the present invention, the user control 12 may be any input device that is operable by a user to cause the command 14 to be sent to the controller 100. For example, the user control 12 may comprise a push button, a lever, or a virtual button on a touch screen. The user control 12 may be located on a control panel close to the aircraft door. The control panel may be located such that the user has a clear line of sight to the area swept by the aircraft door operated by the control panel, whilst the user remains at a safe distance from the aircraft door. Alternatively, the user control 12 may be remote from the aircraft door. The user control 12 may be configured to cause wireless communication of the command 14 to the controller 100.

Figure 2:
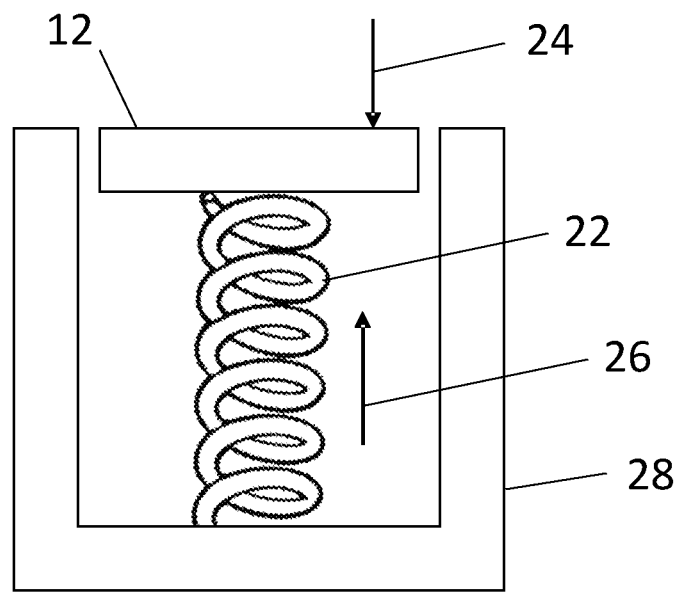
FIG. 2 shows a schematic view of an assembly comprising a user control of the system of FIG. 1.

FIG. 2 shows a schematic view of an assembly comprising the user control 12 of the system 1 of FIG. 1. The user control 12 is configured to cause generation of the command 14 by movement of the user control 12 to a first position, from the position shown in FIG. 2, in the direction indicated by arrow 24. The user control 12 of this embodiment is biased away from the first position by a spring 22. When the user releases the user control 12, the user control 12 is moved by the resilience of the spring 22 in the direction indicated by arrow 26, and the command 14 is no longer generated. The range of movement of the user input 20 is limited by a housing 28 of the assembly. In this example, the housing helps to ensure that the user control 12 is movable only in the directions indicated by the arrows 24, 26. It will be understood that any other suitable type of biased, or unbiased, user control 12 could be used in other embodiments of the aircraft door control system 10.

In this embodiment, and in contrast to the known systems discussed above, the user control 12 is free to be operated by a user when the power to move the aircraft door between the open position and the closed position relative to the door frame is unavailable. The controller 100 is configured such that the command 14 generated by operation of the user control 12 when the power is unavailable is not stored by the controller 100. Accordingly, no interlock, such as that discussed above with reference to the known systems, need be provided to selectively prevent operation of the user control 12.

As noted above, the user control 12 is configured to cause generation of the command 14 by movement of the user control 12 to the first position against the biasing force of the spring 22. The biasing force causes the user control 12 to tend towards a position at which the command 14 is not caused to be generated. The user control 12 cannot, therefore, be inadvertently left by a user in a position at which generation of the command 14 is caused, and will only cause generation of the command 14 when the user control 12 is in the first position. As such, the user control 12 cannot inadvertently be left in a position at which movement of the door would be caused, should the power to move the door subsequently be restored.

In this embodiment, the user control 12 is a first user control 12, and the aircraft door control system 1 comprises a second user control 13. The aircraft door control system 1 is configured such that actuation of the first user control 12 causes generation of the command 14 in dependence on a status of the second user control 13. More specifically, in this embodiment, actuation of the first user control 12 causes generation of the command 14 only when the second user control 13 is operated simultaneously with the first user control 12. In some embodiments, the first user control 12 and the second user control 13 are arranged in series, as shown in FIG. 1, such that the first user control 12 can cause generation of the command 14 only when the second user control 13 is actuated simultaneously with the first user control 12. In other embodiments, the first user control 12 and the second user control 13 are arranged in parallel, so that each of the first and second user controls 12, 13 causes generation of a respective command that is sent to the controller along parallel paths (the path of the command from the second user control shown in FIG. 1 by way of a dashed line). In such alternative embodiments, the controller 100 may be configured to cause movement of the aircraft door between the open position and the closed position relative to the door frame only when the controller 100 receives the commands from both the first user control 12 and the second user control 13 simultaneously.

In some embodiments, the first user control 12 and the second user control 13 are located on a control panel and relatively arranged in such a way that a user cannot operate the first user control 12 and the second user control 13 simultaneously using one hand. For example, the control panel may comprise physical barriers which prevent a user reaching both of the first and second user controls 12, 13 simultaneously using one hand, or the first and second user controls 12, 13 may be spaced apart by more than the span of a user's hand. Accordingly, both of the user's hands are required to operate both of the first and second user controls 12, 13 simultaneously. Such a configuration helps to ensure that the user cannot trap either of their hands in the aircraft door when the aircraft door moves between the open position and the closed position relative to the door frame in response to the command 14.

In this embodiment, the aircraft door control system 1 further comprises a detector 16 communicatively connected to the controller 100 and configured to detect a position of the aircraft door relative to the door frame. The controller 100 is configured to cause movement of the aircraft door between the open position and the closed position relative to the door frame on the basis of an output of the detector 16 received by the controller 100. In this embodiment, the detector 16 is a proximity sensor. However, it will be appreciated that in other embodiments any other suitable detector 16 may be employed. The detector 16 may be configured to detect when the aircraft door is fully open and/or fully closed. The detector 16 may be configured to detect a partially open position of the aircraft door relative to the door frame. The receiver 110 may be configured to receive a signal from the detector 16 that is indicative of a position of the aircraft door relative to the door frame. In other embodiments, the controller 100 may comprise a further receiver for receiving the output of the detector 16.

In this embodiment, the aircraft door control system 1 comprises one or more sensors 18. The one or more sensors 18 are configured to detect whether the power to move the aircraft door between the open position and the closed position relative to the door frame is available. In embodiments in which the power comprises hydraulic power, the one or more sensors 18 may comprise a pressure sensor or other sensor suitable for detecting whether hydraulic power is available. In embodiments in which the power comprises electrical power, the one or more sensors 18 may comprise a voltage detector or other sensor suitable for detecting whether electrical power is available.

The present invention also provides a method of controlling an aircraft door. The method comprises receiving a command to move the aircraft door between an open position and a closed position relative to a door frame, and not storing the command when power to move the aircraft door between the open position and the closed position relative to the door frame is unavailable. The method can be carried out by the aircraft door controller 100, whereby the receiver 110 is configured to receive the command to move the aircraft door between an open position and a closed position relative to a door frame and the controller 100 is configured to not store the command 14 when power to move the aircraft door between the open position and the closed position relative to the door frame is unavailable. In some embodiments, the power comprises hydraulic power. In some embodiments, the power comprises electrical power. In some embodiments, the power comprises hydraulic and electrical power, and the method comprises not storing the command when one or each of the hydraulic and electrical power is unavailable.

Figure 3:
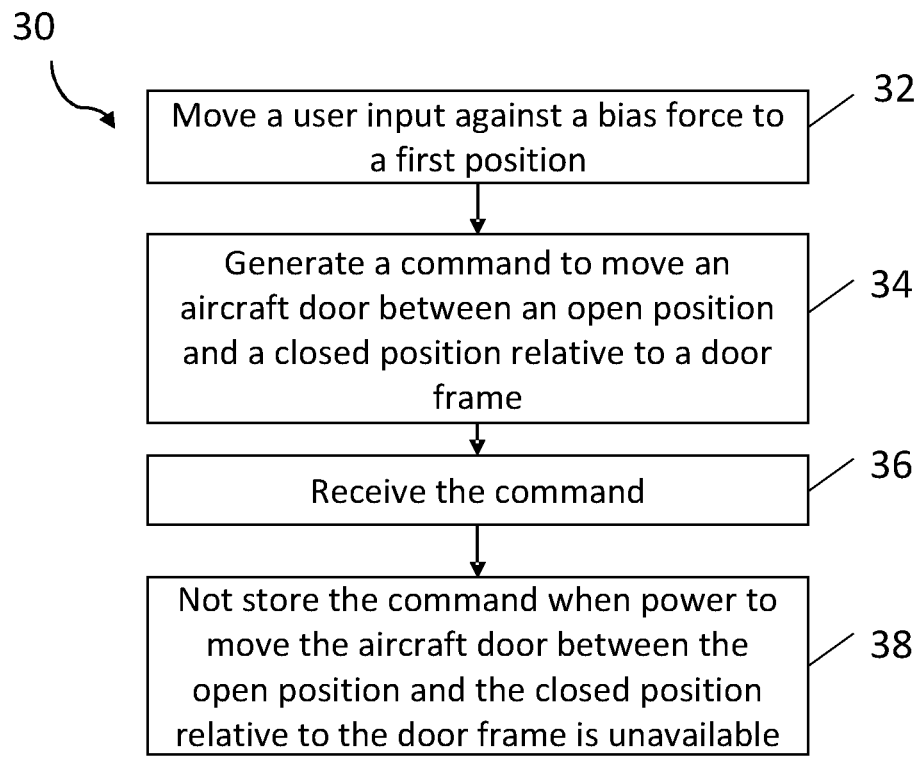
FIG. 3 is a flow diagram showing an example of a method of controlling an aircraft door according an embodiment of the invention.

FIG. 3 is a flow diagram showing an example of a method according to an embodiment of the present invention. The method can be carried out by use of the aircraft landing gear door control system 1 discussed above. The method 30 comprises moving 32 the user control 12 against the biasing force of the spring 22 to a first position, causing 34 generation of the instruction or command 14 to move an aircraft door between an open position and a closed position relative to a door frame, receiving 36 the instruction or command at the controller 100, and not storing 38 the instruction or command or information representative thereof when power to move the aircraft door between the open position and the closed position relative to the door frame is unavailable. That is, the instruction or command is not stored, in dependence on the availability, at the time when the instruction or command is received, of power to perform the instructed movement of the aircraft door. In some embodiments, the command 14 comprises a command to move the aircraft door from the open position to the closed position relative to the door frame. In other embodiments, the command 14 comprises a command to move the aircraft door from the closed position to the open position relative to the door frame. In this embodiment, the aircraft door is a landing gear bay door. However, as noted elsewhere herein, in other embodiments the invention may be employed additionally or alternatively to control movement of one or more cargo bay doors. As noted above, the power may comprise hydraulic and/or electrical power.

Figure 4:
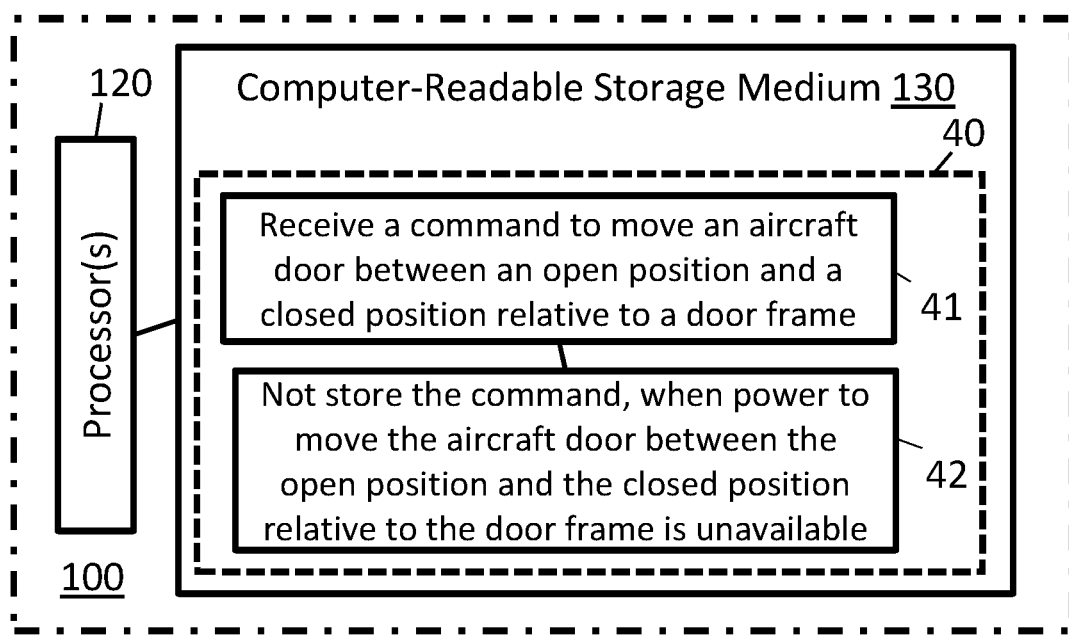
FIG. 4 shows a schematic diagram of an example of a non-transitory computer-readable storage medium according to an embodiment of the invention.

FIG. 4 shows a schematic diagram of a non-transitory computer-readable storage medium according to an embodiment of the invention. The non-transitory computer-readable storage medium stores instructions 40 that, if executed by a processor of an aircraft door controller, cause the processor to perform a method of controlling an aircraft door. In this embodiment, the aircraft door controller, the non-transitory computer-readable storage medium, and the processor are the controller 100, memory 130 and processor 120 of the aircraft landing gear door control system 1 described above with reference to FIGS. 1 and 2. However, in other embodiments, these elements may additionally or alternatively be parts of an aircraft cargo bay door control system to control movement of one or more cargo bay doors. In either case, the instructions 40 comprise receiving 41 a command to move the aircraft door between an open position and a closed position relative to a door frame, and not storing 42 the command, when power to move the aircraft door between the open position and the closed position relative to the door frame is unavailable.

Figure 5:
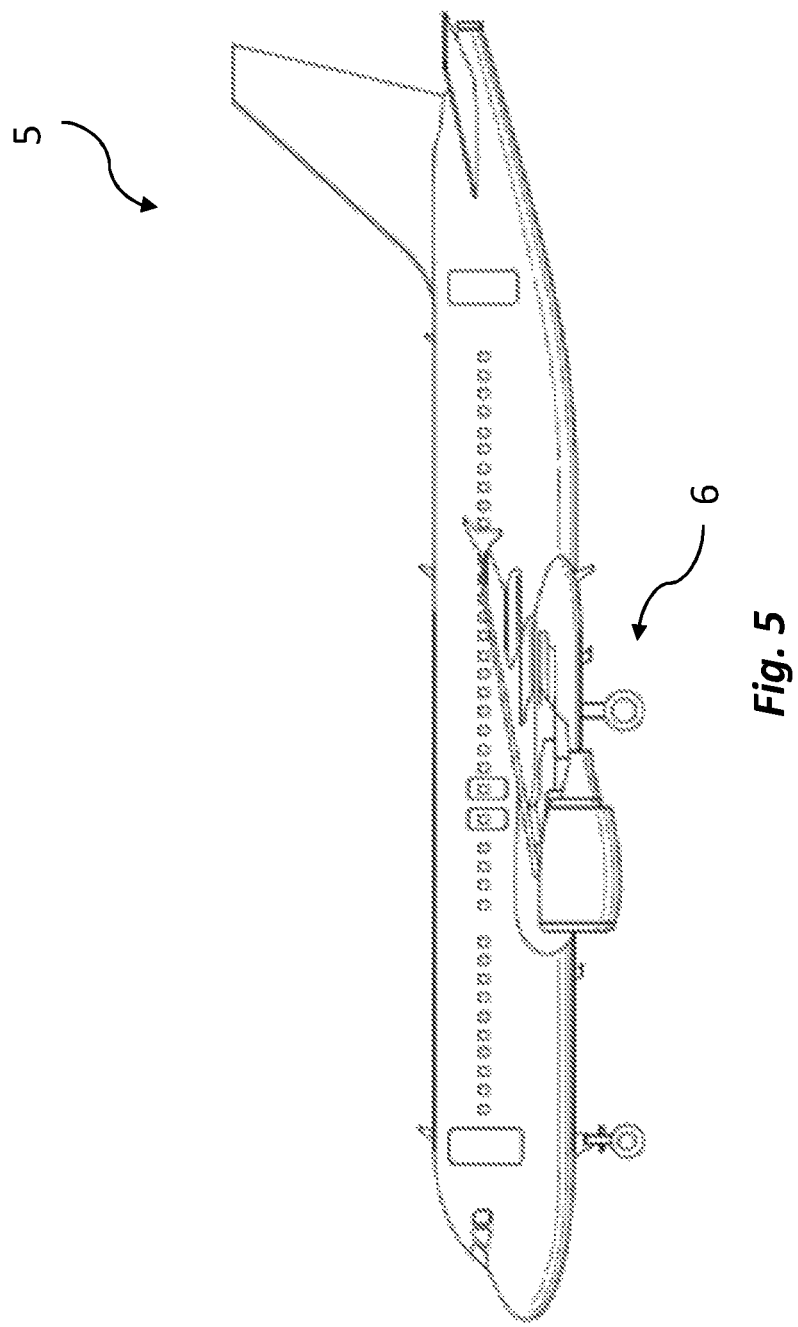
FIG. 5 shows a schematic side view of an example of an aircraft according to an embodiment of the invention.

FIG. 5 shows a schematic diagram of an aircraft 5 in accordance with an embodiment of the present invention. In this embodiment, the aircraft 5 comprises main landing gears 6 and the aircraft landing gear control system 1, comprising the aircraft door controller 100, discussed above for controlling movement of doors of the respective bays for the landing gears 6. The aircraft 5 also comprises the non-transitory computer-readable storage medium discussed above with reference to FIG. 4. In some embodiments, the aircraft 5 comprises at least one cargo bay door and one or more aircraft door control systems according to an embodiment of the invention for controlling movement of the cargo bay door(s).

The above embodiments are to be understood as non-limiting illustrative examples of how the present invention, and aspects of the present invention, may be implemented. Further examples of the invention are envisaged. For example, the aircraft door may be a cargo bay door or any other aircraft door that can be controlled by the controller 100 or the aircraft door control system 1. For example, the aircraft door may be an access hatch for aircraft maintenance. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It is to noted that the term "or" as used herein is to be interpreted to mean "and/or", unless expressly stated otherwise.

The invention claimed is:

1. An aircraft door control system comprising:
 an aircraft door controller including:
  a receiver configured to receive a command to move an aircraft door between an open position and a closed position relative to a door frame; and
  a memory,
  wherein the aircraft door controller is configured to determine whether power to move the aircraft door between the open position and the closed position relative to the door frame is available;
  wherein the aircraft door controller is configured to not store the command or information representative of the command in the memory when the power to move the aircraft door between the open position and the closed position relative to the door frame is unavailable, and
  wherein the aircraft door controller is configured to store the command or the information representative of the command in the memory when the power to move the aircraft door between the open position and the closed position relative to the door frame is available; and
 a user control configured to cause generation of the command when operated by a user regardless of whether the power to move the aircraft door is available.

2. The aircraft door control system according to claim 1, wherein the controller is configured to not store the command by the controller by not latching the command in memory.

3. The aircraft door control system according to claim 1, wherein the user control is configured to cause generation of the command by movement of the user control to a first position, and wherein the user control is biased away from the first position.

4. The aircraft door control system according to claim 1, further comprising a detector configured to detect a position of the aircraft door relative to the door frame, wherein the aircraft door controller is configured to cause movement of the aircraft door between the open position and the closed position relative to the door frame on the basis of an output of the detector.

5. The aircraft door control system according to claim 1, wherein the user control is a first user control and the control system comprises a second user control, and
 wherein the aircraft door control system is configured such that operation of the first user control causes generation of the command in dependence on a status of the second user control.

6. The aircraft door control system according to claim 1, wherein the aircraft door control system is an aircraft landing gear bay door control system.

7. The aircraft door control system of claim 1 wherein the aircraft the aircraft door controller is configured to execute the stored command and thereby issue a further command to move the aircraft door.

8. A method of controlling an aircraft door, the method comprising:
receiving a command to move the aircraft door between an open position and a closed position relative to a door frame, regardless of whether power is available to move the aircraft door;
determining whether power to move the aircraft door between the open and closed positions is available;
not storing the command or information representative of the command in a memory, when the power to move the aircraft door between the open position and the closed position relative to the door frame is unavailable, and
storing the command or information representative of the command in the memory, when the power to move the aircraft door between the open position and the closed position relative to the door frame is available.

9. The method according to claim 8, comprising causing generation of the command by operation of a user control, and
wherein the user control is operable to cause generation of the command when the power to move the aircraft door between the open position and the closed position relative to the door frame is unavailable.

10. The method according to claim 8, wherein the command comprises a command to move the aircraft door from the open position to the closed position relative to the door frame.

11. The method according to claim 8, wherein the power comprises hydraulic power and/or electrical power.

12. The method according to claim 8, wherein the aircraft door is a landing gear bay door or a cargo bay door.

13. The method according to claim 8 further comprising:
if the determination is that the power is available, a controller retrieves the stored command or information representative of the command in the memory and executes the stored command to issue a further command which causes the aircraft door to move.

14. A non-transitory computer-readable storage medium storing instructions that, if executed by a processor of an aircraft door controller, cause the processor to carry out the method of claim 8.

15. An aircraft door controller comprising:
a receiver configured to receive a command to move an aircraft door between an open position and a closed position relative to a door frame, the receiver configured to receive the command regardless of whether power is available to move the door; and
a memory;
wherein the aircraft door controller is configured to determine whether power to move the aircraft door between the open position and the closed position relative to the door frame is available;
wherein the aircraft door controller is configured to not store the command or information representative of the command in the memory when the power to move the aircraft door between the open position and the closed position relative to the door frame is unavailable; and
wherein the aircraft door controller is configured to store the command or the information representative of the command in the memory when the power to move the aircraft door between the open position and the closed position relative to the door frame is available.

* * * * *